(12) United States Patent  
Smith

(10) Patent No.: US 7,648,323 B2  
(45) Date of Patent: Jan. 19, 2010

(54) SYSTEM AND METHOD FOR AUTOMATED PROCESSING OF BULK CONTAINERS

(75) Inventor: Carol Melvin Smith, Columbia, MD (US)

(73) Assignee: United States Postal Service, Washington, DC (US)

( * ) Notice: Subject to any disclaimer, the term of this patent is extended or adjusted under 35 U.S.C. 154(b) by 13 days.

(21) Appl. No.: 10/476,269

(22) PCT Filed: Apr. 30, 2002

(86) PCT No.: PCT/US02/13429

§ 371 (c)(1), (2), (4) Date: Oct. 30, 2003

(87) PCT Pub. No.: WO02/088004

PCT Pub. Date: Nov. 7, 2002

(65) Prior Publication Data

US 2004/0126214 A1    Jul. 1, 2004

Related U.S. Application Data

(60) Provisional application No. 60/287,022, filed on Apr. 30, 2001.

(51) Int. Cl.
*B65G 65/34* (2006.01)
(52) U.S. Cl. .................. 414/421; 414/403; 414/404; 414/414; 414/415; 414/424; 198/375
(58) Field of Classification Search ............. 414/414, 414/415, 421, 424, 403, 404; 198/375
See application file for complete search history.

(56) References Cited

U.S. PATENT DOCUMENTS

| | | | |
|---|---|---|---|
| 3,416,680 A | | 12/1968 | Tomasovich |
| 3,986,624 A | * | 10/1976 | Cates et al. .................. 414/173 |
| 4,354,776 A | | 10/1982 | Matsui |
| 4,730,973 A | * | 3/1988 | Sokolovsky et al. ......... 414/421 |
| 5,282,426 A | * | 2/1994 | Canner ..................... 105/261.1 |
| 5,302,073 A | * | 4/1994 | Riemersma et al. ......... 414/421 |
| 6,120,231 A | | 9/2000 | Christ et al. |
| 6,152,673 A | * | 11/2000 | Anderson et al. ........... 414/408 |
| 6,238,164 B1 | | 5/2001 | Isaacs |
| 6,435,332 B1 | * | 8/2002 | Price .......................... 198/375 |
| 2007/0092367 A1 | | 4/2007 | Smith |

OTHER PUBLICATIONS

International Preliminary Examination Report, dated Feb. 25, 2004, for International Application No. PCT/US02/13429, filed Apr. 30, 2002 (5 pages).

(Continued)

*Primary Examiner*—Michael S Lowe
(74) *Attorney, Agent, or Firm*—Finnegan, Henderson, Farabow, Garrett & Dunner, LLP

(57) ABSTRACT

A system and method is used to automatically process the contents of a containers. The contents may be bulk materials used by a business or organization. The container enters the system via a tow assembly mechanism, a grasping mechanism clasps the container, a lid secures the contents, the container is lifted and rotated to allow the contents of the container to exit the container.

11 Claims, 7 Drawing Sheets

OTHER PUBLICATIONS

Written Opinion, dated Apr. 3, 2003, for International Application No. PCT/US02/13429, filed Apr. 30, 2002 (5 pages).

International Search Report, dated Dec. 17, 2002, for International Application No. PCT/US02/13429, filed Apr. 30, 2002 (5 pages).

Office Action, mailed May 26, 2009, for U.S. Appl. No. 11/638,426, filed Dec. 14, 2006 (11 pages).

Office Action, mailed Sep. 9, 2008, for U.S. Appl. No. 11/638,426, filed Dec. 14, 2006 (8 pages).

Office Action, mailed Dec. 27, 2007, for U.S. Appl. No. 11/638,426, filed Dec. 14, 2006 (7 pages).

Office Action, mailed Apr. 10, 2007, for U.S. Appl. No. 11/638,426, filed Dec. 14, 2006 (8 pages).

Notice of Allowance and Fee(s) Due and Notice of Allowability, mailed Nov. 17, 2009, for U.S. Appl. No. 11/638,426, filed Dec. 14, 2006 (7 pages).

Amendment with Request for Continued Examination, filed Sep. 28, 2009, for U.S. Appl. No. 11/638,426, filed Dec. 14, 2006 (19 pages).

* cited by examiner

SYSTEM AND METHOD FOR AUTOMATED PROCESSING OF BULK CONTAINERS

RELATED APPLICATION

The present application is related to and claims the priority of U.S. Provisional Application No. 60/287,022 filed Apr. 30, 2001, in the name of Carl SMITH, and titled ADVANCED BULK AUTOMATED CONTAINER UNLOADING SYSTEM, the entire contents of which are fully incorporated herein by reference.

TECHNICAL FIELD

This invention relates generally to the automated processing of large containers of bulk material.

BACKGROUND

In industry today, production, manufacturing, and distribution facilities for any business utilize automated services to quickly and efficiently handle bulk materials. These bulk materials may include anything from products sold by a company to bulk mail sent and received by businesses and other organizations. In the case of bulk mail, many businesses and organizations specializing in mail delivery have bulk mail facilities, which process and sort mail according to certain user defined criteria (e.g., recipient's name, ZIP code, street address, etc.). These facilities can exist for any type of business. The purpose of having a facility designed for processing materials in bulk is to improve the entire assembly line process of getting materials to and from the business or organization efficiently so that the consumer may realize a cost savings or receive a higher quality product or service. Handling materials in bulk is more efficient and cost effective than handling materials individually, and businesses and other organizations constantly seek to improve the steps in existing methods and systems to make the entire process more efficient and cost-effective.

One step in processing bulk materials, for example, is the initial step of receiving the incoming materials at the bulk material processing facility. Current methods of transporting bulk materials, for example unloading the contents of a truck onto a loading dock, may be slow and require too much human exertion to be cost effective and efficient. Furthermore, increased human intervention, even in automated processes, in handling bulk materials increases the risk of harm to employees or workers of the bulk material processing facility. Current methods of automated transporting of bulk materials are not user friendly, may cause delays in the entire production, manufacturing, or distribution process, and may have a high risk of harm to workers when manual attention is needed.

It is therefore desirable to provide systems and methods to allow for the safe, efficient, cost effective, and automated transportation of bulk materials to the facilities engaged in processing those bulk materials.

SUMMARY

There is provided a system for automatically processing contents of a first container, comprising a system for automatically processing contents of containers, comprising a tow assembly for advancing a first container to a first predetermined position; a grasping mechanism for securely clasping the first container at the first predetermined position; a lifting mechanism, coupled to the grasping mechanism, for moving the first container between the first predetermined position and a second predetermined position, and to begin rotating the container, at the second predetermined position, to a third predetermined position; and a lid mechanism for covering the contents of the first container at the first predetermined position and moving apart to allow the contents to be released from the container at the third predetermined position.

There is also provided A method for automatically processing contents of containers; comprising advancing a first container, in an upright position, along a path with a tow assembly mechanism; grasping the first container at a first predetermined position; lifting the container to a second predetermined position, while the contents are secured inside the first container by a lid; rotating the first container to a third predetermined position and moving the lid sufficiently to allow the contents to exit from the first container; returning the first container, in the upright position, to the first predetermined position; and advancing the first container along the path so that a second container may be processed.

Additional features and advantages will be set forth in part in the description which follows, and in part will be obvious from the description, or may be learned by practice of the claims. The advantages will be realized and attained by means of the elements and combinations particularly pointed out in the appended claims.

It is to be understood that both the foregoing general description and the following detailed description are exemplary and explanatory only and are not restrictive of the appended claims.

DETAILED DESCRIPTION

Figure 1:
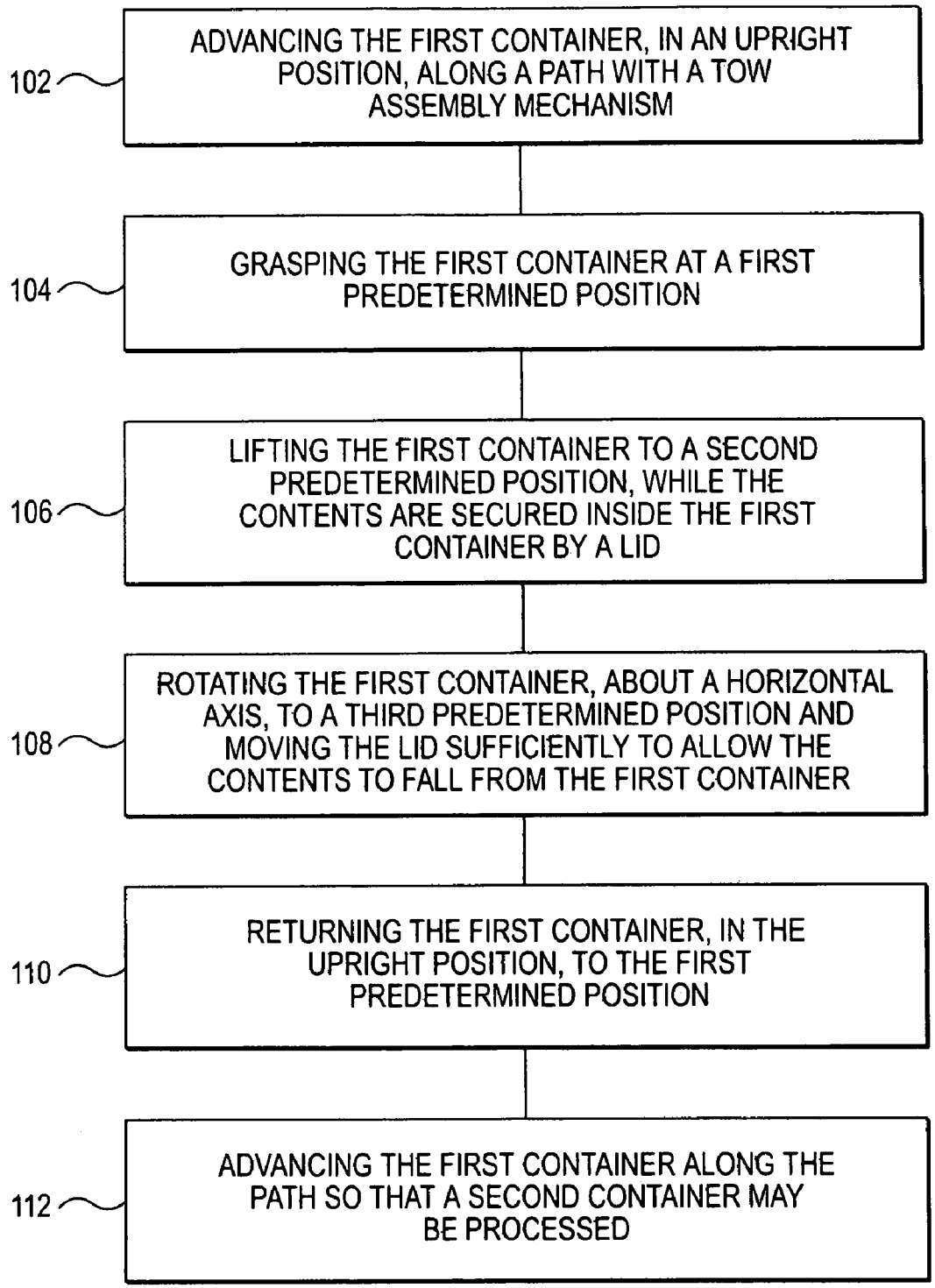
FIG. 1 is a flowchart of a method of processing a bulk container, consistent with the present invention.

Referring now to the drawings, in which the same reference numbers will be used throughout the drawings to refer to the same or like parts, FIG. 1 is a flowchart of a method for automatically processing bulk materials, for example, unloading a large and heavy container of packages. A method for processing bulk materials in a container begins at Stage 102, where a user places a container full of packages, using the example from above, in a position accessible to a tow assembly, so that the tow assembly advances the container to a predetermined first position. The tow assembly may be a chain in the floor which attaches to the container and pulls the container along a track. The container may include a securing component, such as a net or lid, to prevent the contents from spilling from the container.

The predetermined first position is a user defined station where the container is placed in order to fulfill the other stages within the method of processing materials in a bulk container. The first predetermined position can be inside a system or machine designed to implement the stages described herein.

Once the container is at the first predetermined position, a grasping mechanism, such as a set of arms, securely grip the container at Stage 104, so that the container is securely fastened within the mechanism. The arms can be made of high pressured vulcanized rubber or another suitable material to hold and handle the container.

Once the arms have securely gripped the container, the container is lifted, at Stage 106, to a second predetermined position. The second predetermined position may be directly above the first predetermined position, so that the container is suspended at a height suitable for rotation about a horizontal axis.

At Stage 108, the lid is opened and the container is rotated about a horizontal axis to an angle to allow the contents of the container. A suitable angle for this purpose may be approximately 155 degrees from the initial orientation of the container at the second predetermined position. A guide may be used to ensure that the contents are safely removed from the container without damage. In addition, the container may be jostled or shaken, to allow trapped contents to unfasten and fall from the container.

Once the contents have been discharged from the container, the container is rotated back to an upright position and returned to the first predetermined position at Stage 110. At Stage 112, the container is advanced further along the track by the tow assembly and the method is repeated for other containers that need to be processed in this manner.

Figure 2:
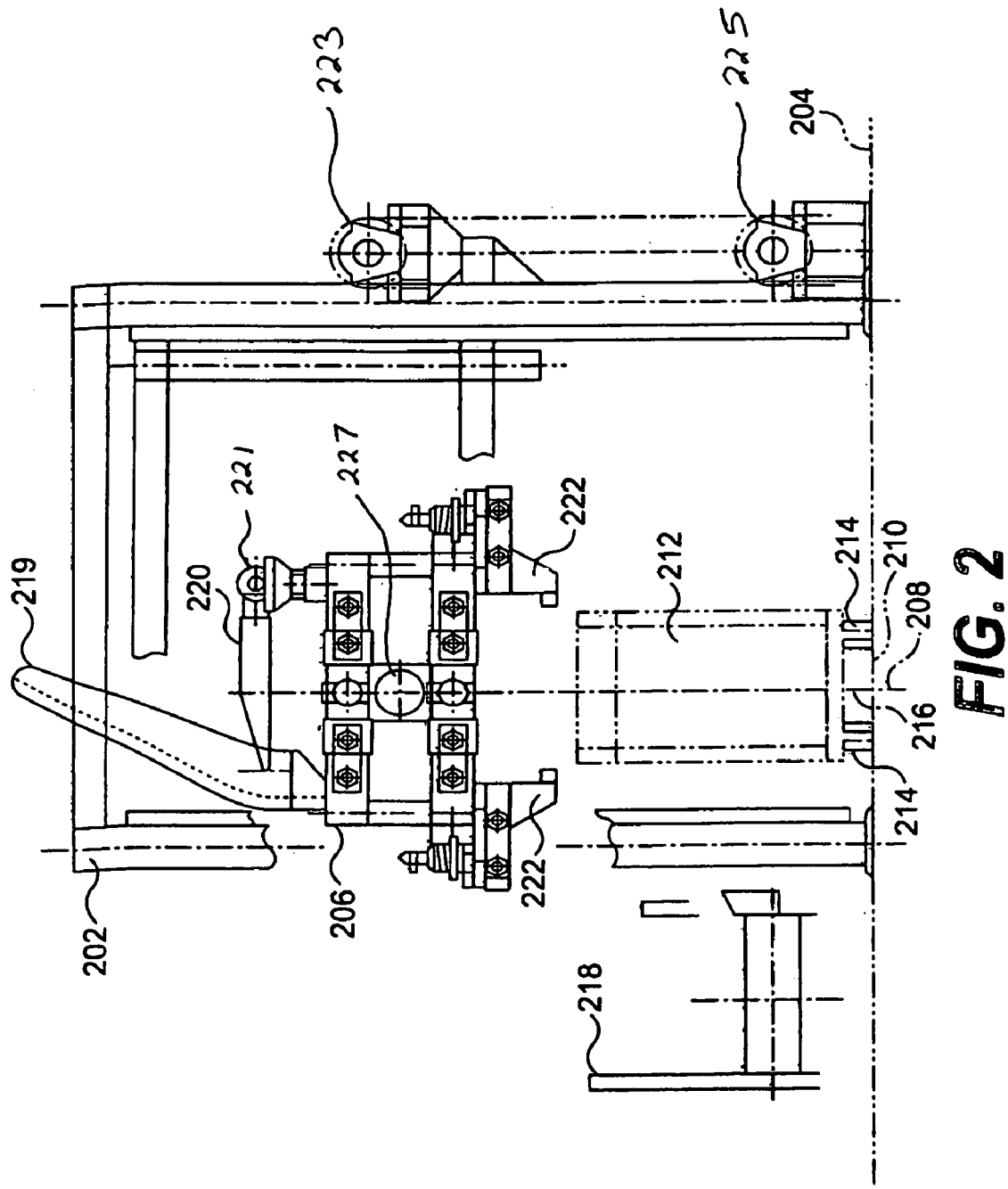
FIG. 2 is a front view of a system for processing a bulk container.

FIG. 2 is a front view of a system 200 for processing bulk containers, using, for example, the method outlined in FIG. 1. System 200 may include a support structure 202 mounted on a platform 204, a lifting mechanism 206, a track 208, pusher 210, container 212, and a repository 218. Container 212 may further include wheels 214 and a pin 216. The contents of container 212 may constitute anything that needs processing under the method of FIG. 1, including bulk mail packages.

Lifting mechanism 206 may further include a guide 219, a lid 220, and clamps 222. FIG. 2 shows lifting mechanism 206 in an up position, as lifting mechanism 206 waits for container 212 to advance to the first predetermined position, which may be a position directly underneath lifting mechanism 206 on platform 204. Lifting mechanism 206 is described in further detail below.

Container 212, using wheels 214, is moved onto platform 204 along track 208. As container 212 advances to the first predetermined position, pin 216, which may be located on the bottom side of container 212, engages a pusher 210, so that container 212 may be secured to follow track 208.

System 200 may also include structures to guard against an overflow of containers from entering. There may be a situation where other containers to be processed precede container 212 in a process queue. Container 212 may not be processed until all preceding containers are processed. This may be implemented by using an overflow limit switch 211 in track 208 to prevent system 200 from accepting container 212 if another container is already being processed. Such an overflow situation may cause the loop to be shut down and an appropriately labeled alarm to be displayed on a human machine interface (HMI) (not shown).

Figure 3:
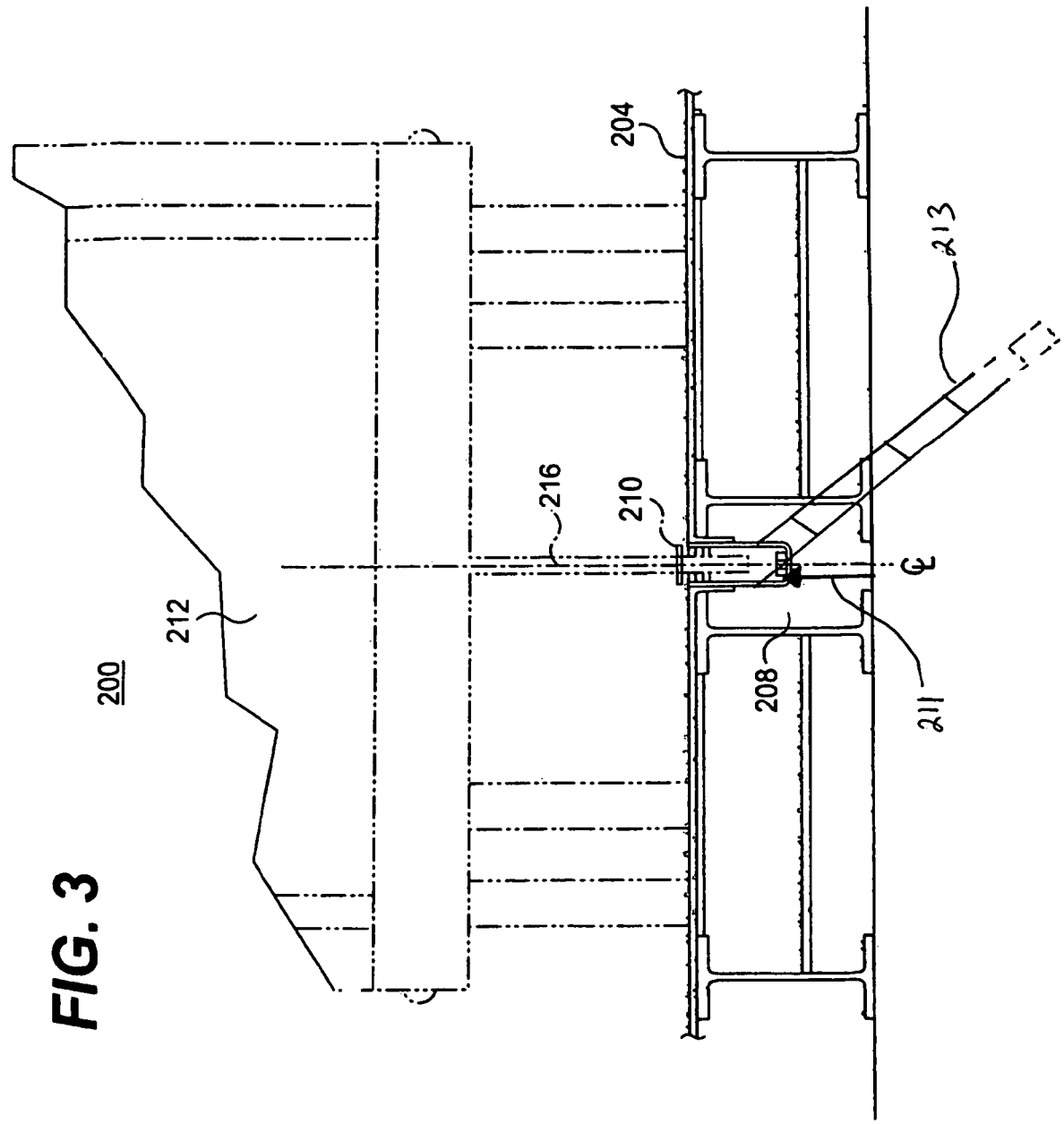
FIG. 3 is a cross sectional view of FIG. 2.

FIG. 3 shows system 200 in greater detail. In FIG. 3, container 212 is inside system 200 and on top of platform 204. Pin 216, attached to the bottom of container 212 engages pusher 210, so that container 212 is secured to track 208. Pusher 210 advances container 212 to proceed along track 208. A towline assembly may also be included in track 208. The towline assembly may include a chain 213 attached to pusher 210 that pulls container 212 into system 200 after pin 216 engages pusher 210, but may include anything capable or suitable to pull container 212.

Figure 4:
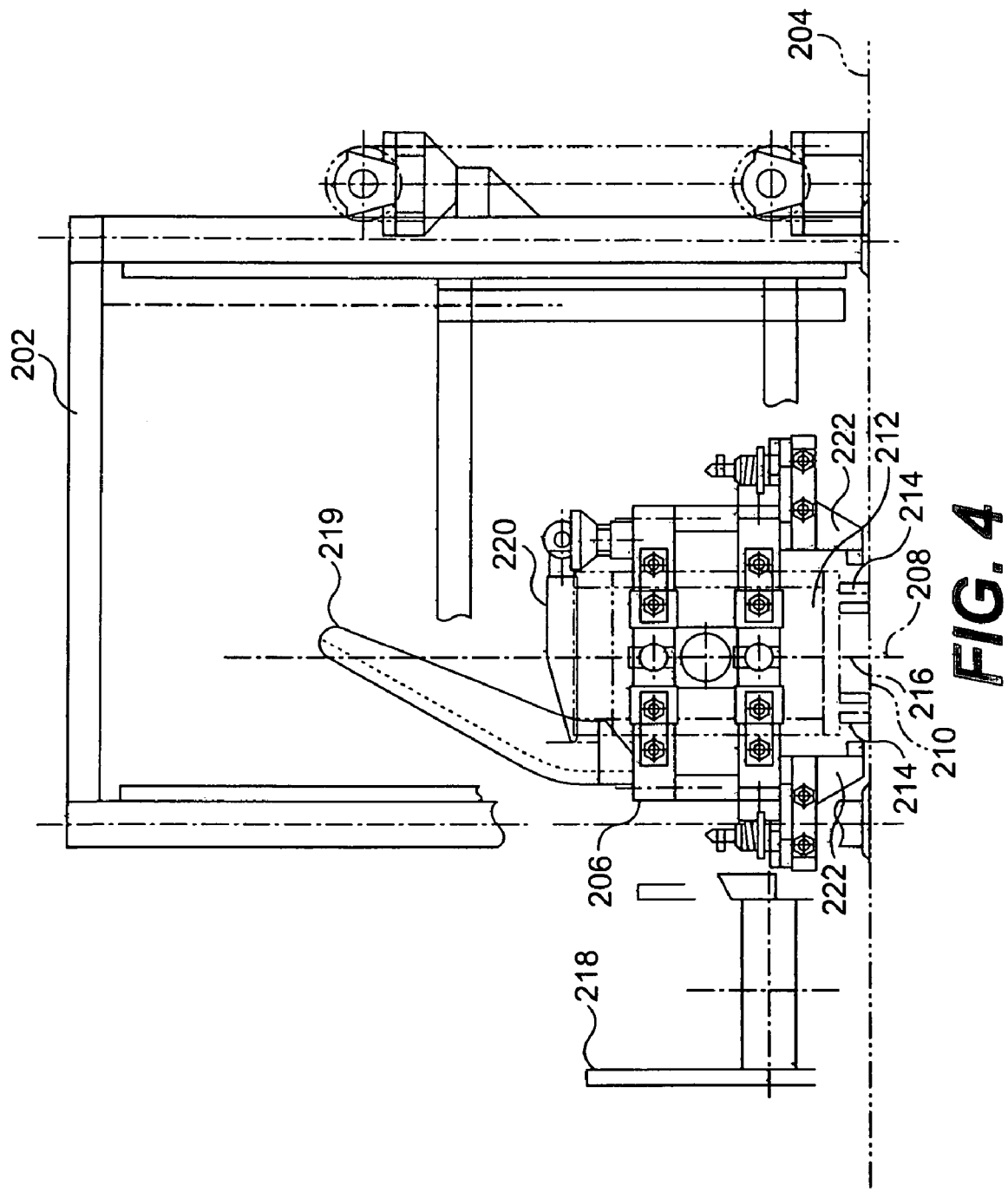
FIG. 4 is a front view of FIG. 2, showing a step involved in processing bulk containers.

FIGS. 4 through 7, front views of previously described system 200, show in greater detail the method outlined in FIG. 1. FIG. 4 is a front view of system 200 using, for example, the method outlined in FIG. 1. FIG. 4 shows system 200 lowered over container 212 at the first predetermined position. After container 212 enters system 200, pin 216 engages pusher 210, lifting mechanism 206 lowers over container 212 and lid 220 closes (or remains closed) to secure the contents of container 212. The contents of container 212 may be packaged bulk mail, which is being transported to a conveyor belt or a storage bin.

Figure 5:
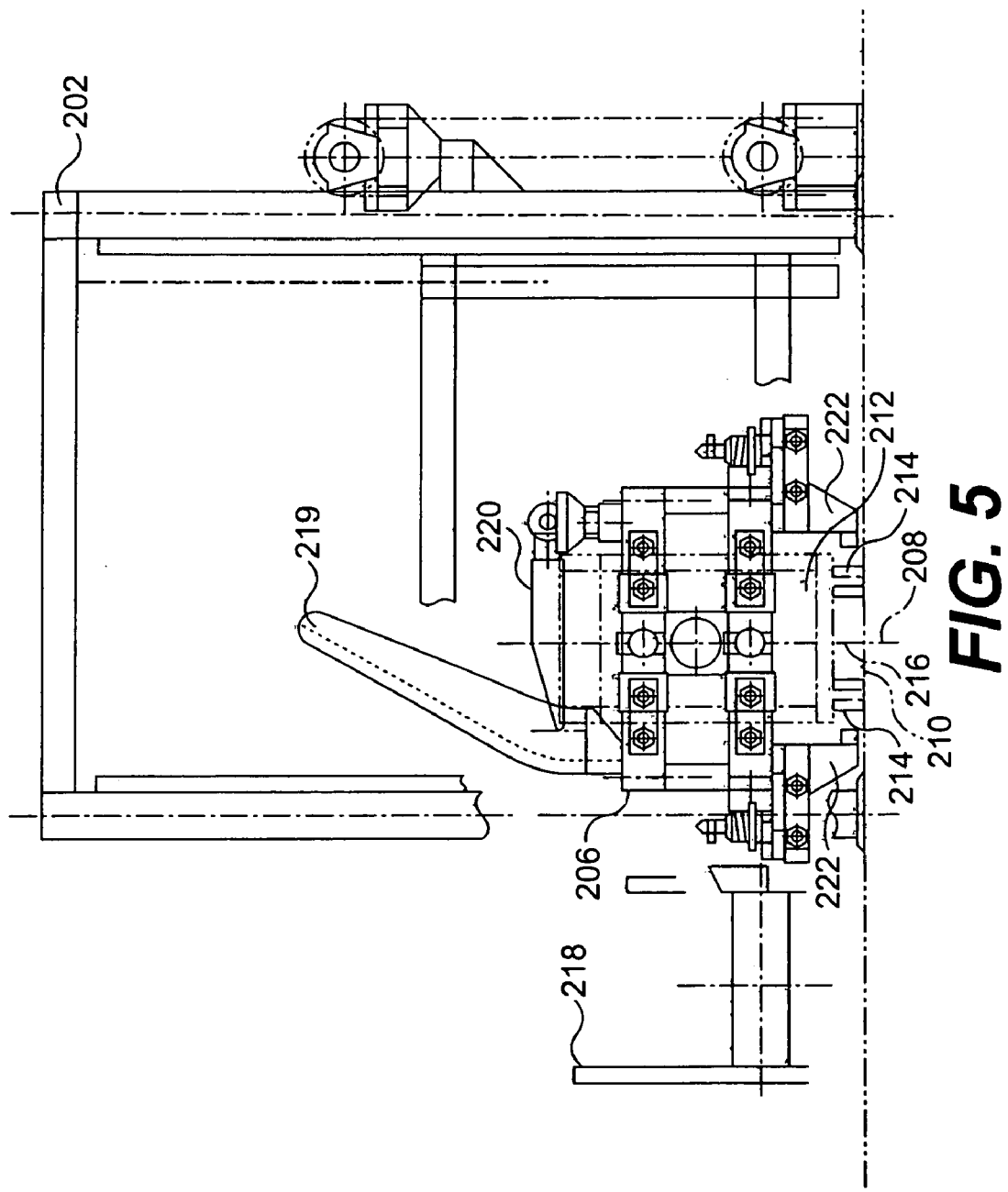
FIG. 5 is a front view of FIG. 2, showing a step involved in processing bulk containers.

Next, referring to FIG. 5, clamps 222 securely grasp container 212 in preparation of lifting container 212. The position of container 212, when still on platform 204, may be a user defined first predetermined position, as previously described.

Figure 6:
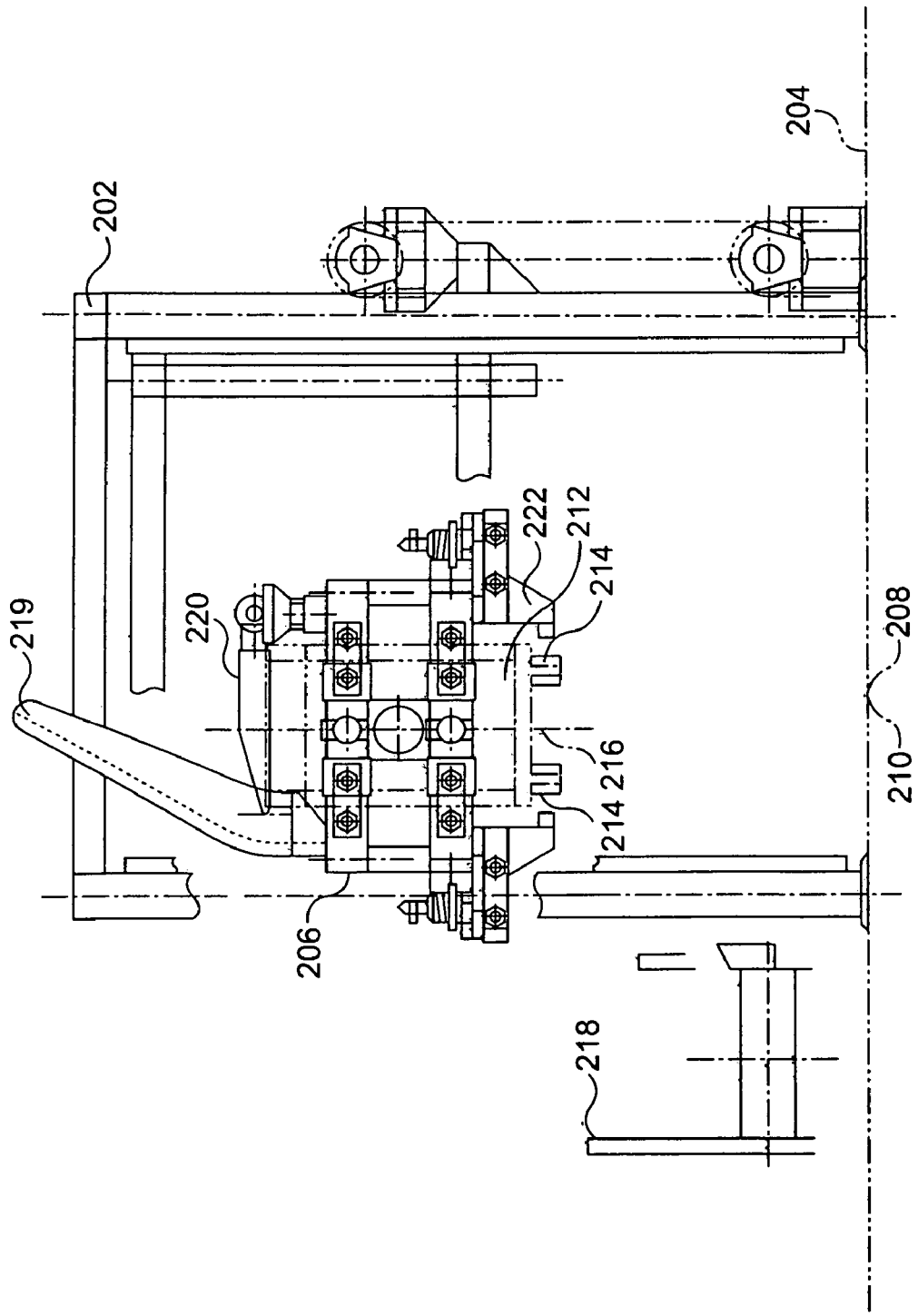
FIG. 6 is a front view of FIG. 2, showing a step involved in processing bulk containers.

Referring to FIG. 6, pusher 210 disengages pin 216 and lifting mechanism 206 lifts container 212 via lifting motors 223 and 225 to a user defined second predetermined position. The second predetermined position can be above the first predetermined position to allow lifting mechanism 206 and container 212 to rotate via rotating motor 227.

Figure 7:
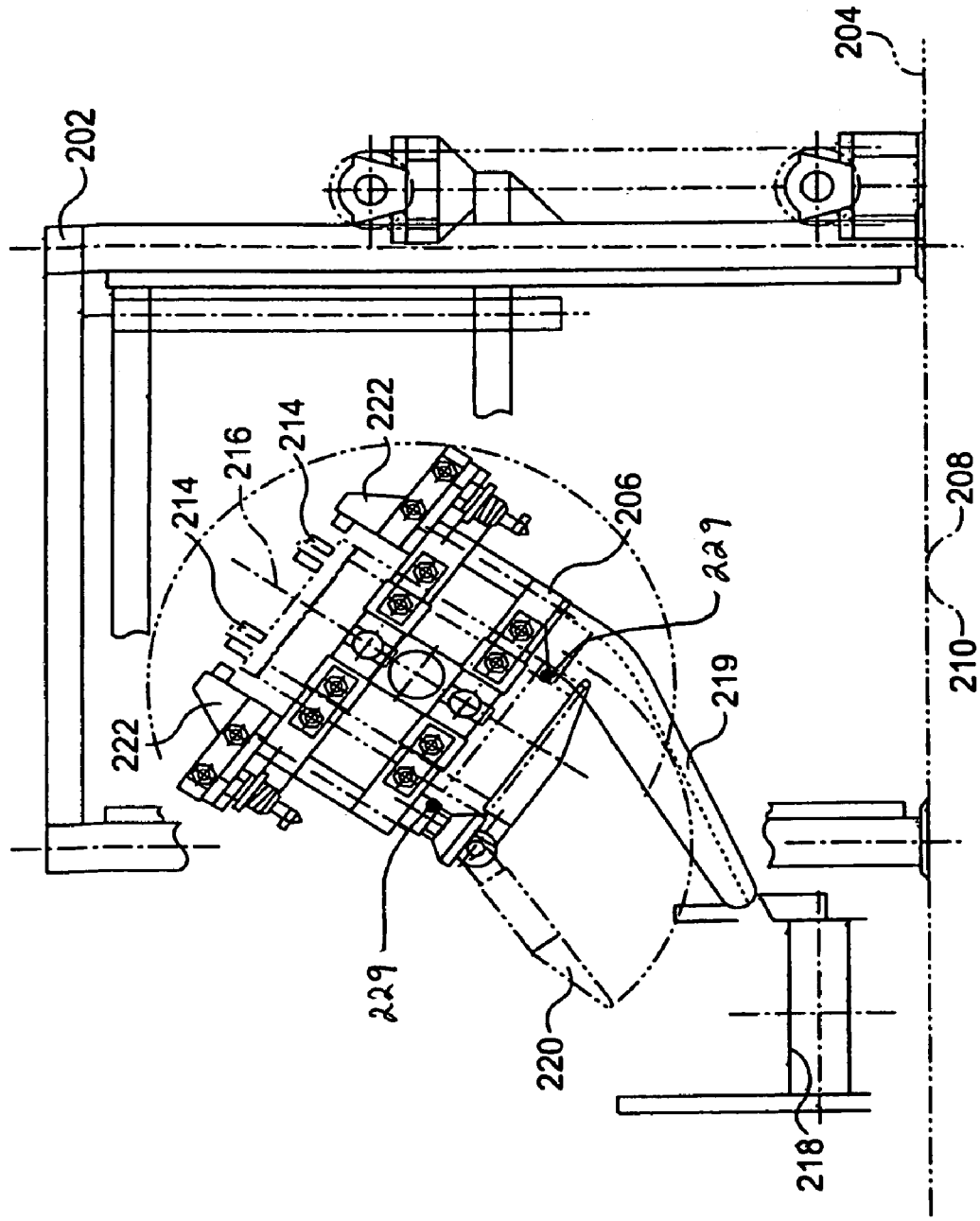
FIG. 7 is a front view of FIG. 2, showing a step involved in processing bulk containers.

Next, in FIG. 7, lifting mechanism 206 rotates about an axis perpendicular to the plane of FIG. 7, in order to empty container 212. The lifting mechanism may rotate either way, but should rotate to an angle that allows the contents to safely fall from container 212. Once lifting mechanism 206 and container 212 have reached that angle, the stoppage of the rotating motor 116 provides a signal for the lid lifter motor 221 to start. The lid lifter motor 221 opens lid 220 incrementally, thereby allowing the contents of container 212 to fall into repository 218. Also, guide 219 may be used in guiding the contents of container 212 into repository 218, to ensure all the contents reach repository 218 without damaging the contents. Repository 218 may be any suitable device used in conjunction with transporting bulk materials (e.g., a bin, a loading truck, or a conveyor belt). Lifting mechanism 206 may also have sensors 229 located on either side of the opening of container 212 that may allow the system 200 to sense whether the contents have all been removed from container 212. For example, a photo electric sensor in the lifting mechanism 206 may monitor initial item flow from the container 212 and sense a jam. To facilitate emptying, lifting mechanism 206 may also jostle or shake container 212 to loosen trapped contents by slightly rotating container 212 back and forth.

Once all the contents have been removed from container 212, lifting mechanism rotates back into the second predetermined position and then subsequently lowers to the first predetermined position (see FIG. 5). If sensors 229 are used, lifting mechanism 206 can return to the first predetermined position after the sensors 229 indicate that the flow of materials exiting container 212 has ended. At the second predetermined position, clamps 222 disengage from container 212 (FIG. 4) and lifting mechanism 206 raises to its up position (see FIG. 3), leaving processed container 212 on platform 204. Pin 216 engages pusher 210 and container 212 is advanced out along track 208.

Other embodiments will be apparent to those skilled in the art from consideration of the specification and practice of the appended claims disclosed herein. It is intended that the specification and examples be considered as exemplary only, with a true scope and spirit being indicated by the following claims.

What is claimed is:

1. A system for automatically processing contents of containers, comprising:
- a tow assembly located in a track, the tow assembly including a chain;
- a pusher located in the track and removably connected to the chain, the pusher engaged to a pin affixed permanently to a bottom portion of a first container for securing the first container to the track and for advancing the first container to a first predetermined position along the track;
- a grasping mechanism configured to securely clasp the first container at the first predetermined position;
- a lifting mechanism, coupled to the grasping mechanism, and configured to:
  - lift the first container from the first predetermined position to a second predetermined position, disengaging the pin from the pusher,
  - rotate the first container from the second predetermined position to a third predetermined position that allows the contents to empty, and
  - after the contents of the first container are emptied, rotate the first container from the third predetermined position back to the second predetermined position, and move the first container from the second predetermined position back to the first predetermined position, engaging the pin with the pusher;
- a lid mechanism connected to the lifting mechanism and configured to cover the contents of the first container at the first predetermined position and move to allow the contents to be released from the container at the third predetermined position; and
- a guide, connected to the lifting mechanism, and configured to guide the contents after release by the lid mechanism.

2. The system of claim 1, further comprising an overflow mechanism which prevents a second container from entering the first predetermined position when the first container is being processed.

3. The system of claim 1, further comprising sensors to indicate when the first container is either at the first predetermined position, the second predetermined position, or the third predetermined position.

4. The system of claim 1, wherein the third predetermined position is at an angle of approximately 155 degrees from the second predetermined position.

5. The system of claim 1, wherein lid mechanism contains a sensor to monitor and detect a flow of the contents exiting from the first container.

6. The system of claim 1, wherein the lifting mechanism jostles the first container at the third predetermined position to loosen the contents from the first container.

7. The system of claim 6, wherein the lifting mechanism includes a sensor to detect whether the first container is emptied, and wherein the lifting mechanism jostles the first container at the third predetermined position until the first container is emptied.

8. The system of claim 1, comprising a first motor for lifting the first container, a second motor for rotating the first container, and a third motor to move the lid mechanism.

9. The system of claim 1, further comprising:
- a repository for receiving the contents of the first container at the third predetermined position and transporting the contents.

10. The system of claim 9, wherein when the first container is at the third predetermined position, the guide touches the repository to create a path between the first container and the repository.

11. The system of claim 1, wherein the lid mechanism is pivotably connected to the lifting mechanism, and wherein the lid mechanism is rotated pivotably to an open position to release the contents of the first container.

* * * * *

UNITED STATES PATENT AND TRADEMARK OFFICE
CERTIFICATE OF CORRECTION

| | | |
|---|---|---|
| PATENT NO. | : 7,648,323 B2 | Page 1 of 1 |
| APPLICATION NO. | : 10/476269 | |
| DATED | : January 19, 2010 | |
| INVENTOR(S) | : Carl M. Smith | |

It is certified that error appears in the above-identified patent and that said Letters Patent is hereby corrected as shown below:

On the title page, Item 75, entitled Inventor, line 1, "Carol" should read -- Carl --.

Signed and Sealed this

Sixth Day of April, 2010

David J. Kappos
*Director of the United States Patent and Trademark Office*